Feb. 15, 1938. W. E. SYKES 2,108,239
CUTTER SHARPENING MACHINE
Filed Feb. 8, 1934 4 Sheets-Sheet 1

INVENTOR
William E. Sykes
BY
Fraser, Hughes & Manley
ATTORNEYS.

Feb. 15, 1938.   W. E. SYKES   2,108,239
CUTTER SHARPENING MACHINE
Filed Feb. 8 1934   4 Sheets-Sheet 2

INVENTOR
William E. Sykes
BY
ATTORNEYS

Feb. 15, 1938.  W. E. SYKES  2,108,239
CUTTER SHARPENING MACHINE
Filed Feb. 8, 1934  4 Sheets-Sheet 3

INVENTOR
William E. Sykes
BY
ATTORNEYS.

Feb. 15, 1938.  W. E. SYKES  2,108,239
CUTTER SHARPENING MACHINE
Filed Feb. 8, 1934   4 Sheets-Sheet 4

INVENTOR
William E. Sykes
BY
ATTORNEY

Patented Feb. 15, 1938

2,108,239

UNITED STATES PATENT OFFICE 2,108,239

CUTTER SHARPENING MACHINE

William E. Sykes, Buffalo, N. Y.

Application February 8, 1934, Serial No. 710,261

12 Claims. (Cl. 51—96)

This invention relates to certain new and useful improvements in machines for sharpening cutters, being particularly directed to machines for sharpening gear cutters of the wheel type in which the cutting teeth are helically arranged on the periphery of the cutter. Such cutters are largely used in the production of spiral gears, helical gears both of the plain or herring-bone types, worm gears, worm wheels, etc.

The principal objects of the invention are to provide a simple and effective grinding machine especially adapted to sharpen such helical gear cutters, which is rapid in operation, which is adapted to grind both sides of each cutter tooth, and which is adapted to grind both right-hand and left-hand cutter wheels.

Other features of improvement are hereinafter more fully described.

In the drawings which illustrate one form of the invention,

Figure 7:
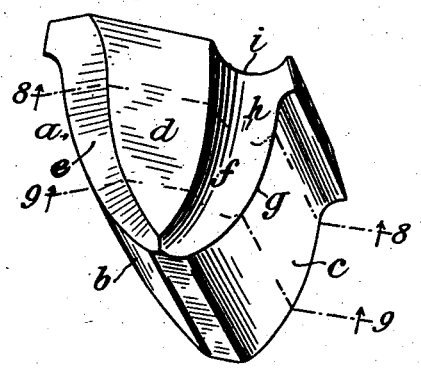
Figure 8:
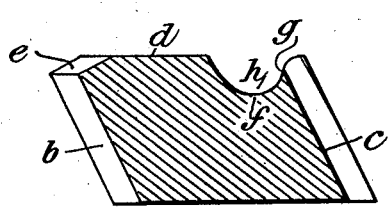
Figure 9:
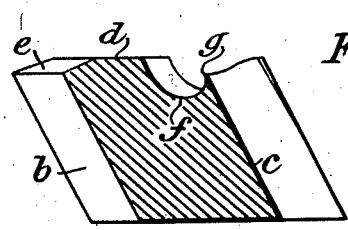

Fig. 7 is a perspective view of a new cutter tooth provided by the invention; and Figs. 8 and 9 are sections on the lines 8—8 and 9—9 respectively in Fig. 7.

Figure 6:
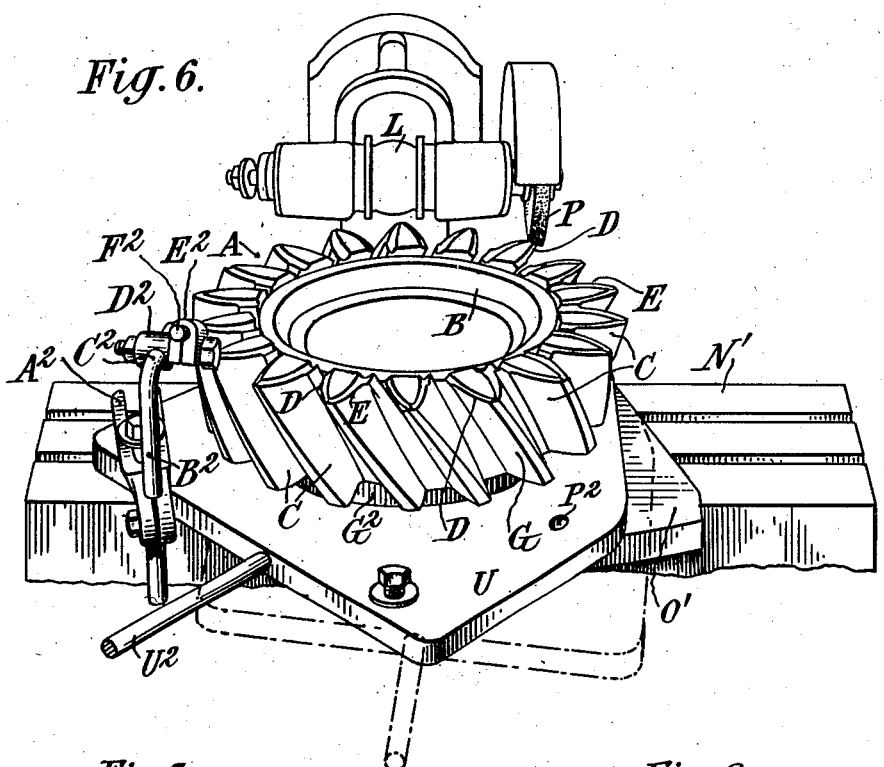
Fig. 6 is a perspective view of the front of the machine showing the cutter in operation.

Referring first to Fig. 6, I will first describe the type of cutter wheel which the present grinder is particularly adapted to sharpen. This cutter wheel is designated by the reference letter A. It comprises an annular hub portion B having distributed around it a series of cutter teeth C. In the illustration shown the cutter A is a helical cutter designed to cut teeth of a helical nature, such as on so-called spiral or helical gears and particularly of the herring-bone type. The cutter wheel illustrated is a left-hand cutter wheel, the cutter teeth of which have a fairly acute helical angle. The upper side of the cutter wheel shown in Fig. 6 is the operative side, and because of the acute angle of the teeth the latter require to be dressed or sharpened on both sides in order to produce the most suitable cutting edges. For certain helical angles of cutter teeth, as is well-known, if the front of the wheel with its teeth lies in a plane perpendicular to the axis of the wheel, one side of each of the cutter teeth will intersect such normal plane at an angle which is suitable for cutting work. The opposite side of each tooth, however, requires to be dressed or sharpened in order to provide a cutting edge which will efficiently cut the material of the gear or other part to be shaped. Such a proper cutting angle is subject to some modification, but, generally speaking, is usually a rough approximation of somewhat less than a right angle. In the cutter wheel illustrated in Fig. 6, as before stated, the helical angle is so high that if the front face of the cutter be shaped in a plane which is normal to the axis of the cutter wheel, the edges D of the individual cutters would be too acute for effective work, while the edges E on the opposite sides of the individual cutters would be too obtuse. Hence in the process of sharpening, the edges D are made less acute and the edges E are made more acute. The particular cutter wheel illustrated in Fig. 6 has certain features of novelty with regard to the formation of the cutting edge E, which features of novelty will be hereinafter referred to. As will be observed from this figure, grinding wheel P is shown operating on the edge D of one of the cutter teeth, the general formation of the grinding wheel being such as to produce a less acute edge than would be produced by a plane normal to the axis of the cutter intersecting the side C of the cutter tooth. Instead of making the periphery of the grinding wheel conform to the cut, a cylindrical or other shaped wheel may be used and the side or other face of the wheel used for the cut. This may require swivelling or tilting of the wheel or work in a manner to be described.

The sides of the teeth are usually perceptibly curved, the degree of curvature depending upon the character of work to be done and the number of teeth with which the cutter is provided. In some instances the sides of the cutter teeth are as near as practicable involute curves struck from the base circle of the cutter. In other instances this form is materially deviated from.

In general the form of cutter illustrated is that described and claimed in my Patent No. 1,668,345, wherein all of the cutting edges lie in the plane of rotation of the cutter wheel. Such edges may be ground by hand and otherwise to produce such a location of the cutting edges, particularly on what may be called the acute side of the front face of the cutter tooth. When the cutter is used for single helical gears, such a location of the cutting edge of the tooth is not of great importance, but when the cutter is used for herring-bone gears it is important that the cuts on the inside of the apex of the gear teeth shall be very nearly accurate, although there is a permissible leeway on the opposite cuts so that the side of the cutter on the outside of the apex may extend beyond the apex.

The machine provided by the present invention is designed to sharpen all such cutter teeth rapidly and with sufficient approximation to the ideal conditions to produce a thoroughly satisfactory cutter.

Referring now to Figs. 1 to 5, let H indicate a suitable base mounting in the machine, having bolted thereto at its rear a standard I carrying at the top the grinding wheel mechanism. This mechanism is carried in a large bore at the top of the standard on a barrel J extending completely through the bore. A suitable electric motor K may be fastened to the rear of the standard, and a belt drive provided for the grinding wheel pulley L which is mounted upon a shaft M, preferably running in two sets of roller-bearings N, O, and having each end threaded to receive a grinding disc or wheel P or Q, it being understood that the grinder P is adapted for use in sharpening one side of each of the cutter teeth, and the wheel Q being adapted to sharpen the opposite side thereof. The wheel Q is shown as having a rounded grinding edge which is well adapted for grinding the grooved face E which will be more fully described.

The standard at its top is cut at R and is provided with a clamp bolt S which will put sufficient pressure on the closely fitting barrel J to hold the same in place. By this means the grinding wheel shaft, which is normally horizontal, may be tilted to an angle to the horizontal as may be required in the cut to be performed. The cutter wheel to be ground is mounted upon a work-table U, which is characterized by the fact that it swings around a pivotal axis V (Figs. 1, 2 and 3) to move each cutter tooth along the periphery of the grinder in the curve required to properly dress or sharpen the tooth. This is best illustrated in Fig. 6, wherein the work-table in its full-line position has presented to the operation of the grinding wheel P the edge of a tooth at its apex. By swinging the work-table toward the dotted-line position, as by a handle $U^2$, successive portions of the edge of the tooth are presented to the cutter wheel, thereby grinding the tooth as far as may be desired toward its base. When a cut is finished the work-table is swung in a reverse direction until the wheel and tooth are separated, whereupon the cutter wheel may be moved by hand to bring a new tooth in position and the operation repeated.

The general operation being thus understood, I will describe in detail the various features which are designed to facilitate the operation of the machine.

It will be observed that on the front of the machine is fixed a pedestal W which is of hollow construction and within which a plunger X is designed to move vertically. This plunger X, which is hollow, is provided with an internally screw-threaded flange Y which receives a vertical adjusting screw Z. This adjusting screw Z is mounted in a bearing A' in the pedestal W, and at its lower end carries a bevel gear B' which is designed to be rotated by a similar gear C', carried on the end of a shaft D' running obliquely through the side of the machine, and there being provided with a hand-wheel E' having an operating handle F'. By this means the plunger X may be raised and lowered and held accurately in its adjusted vertical positions.

Figure 1:
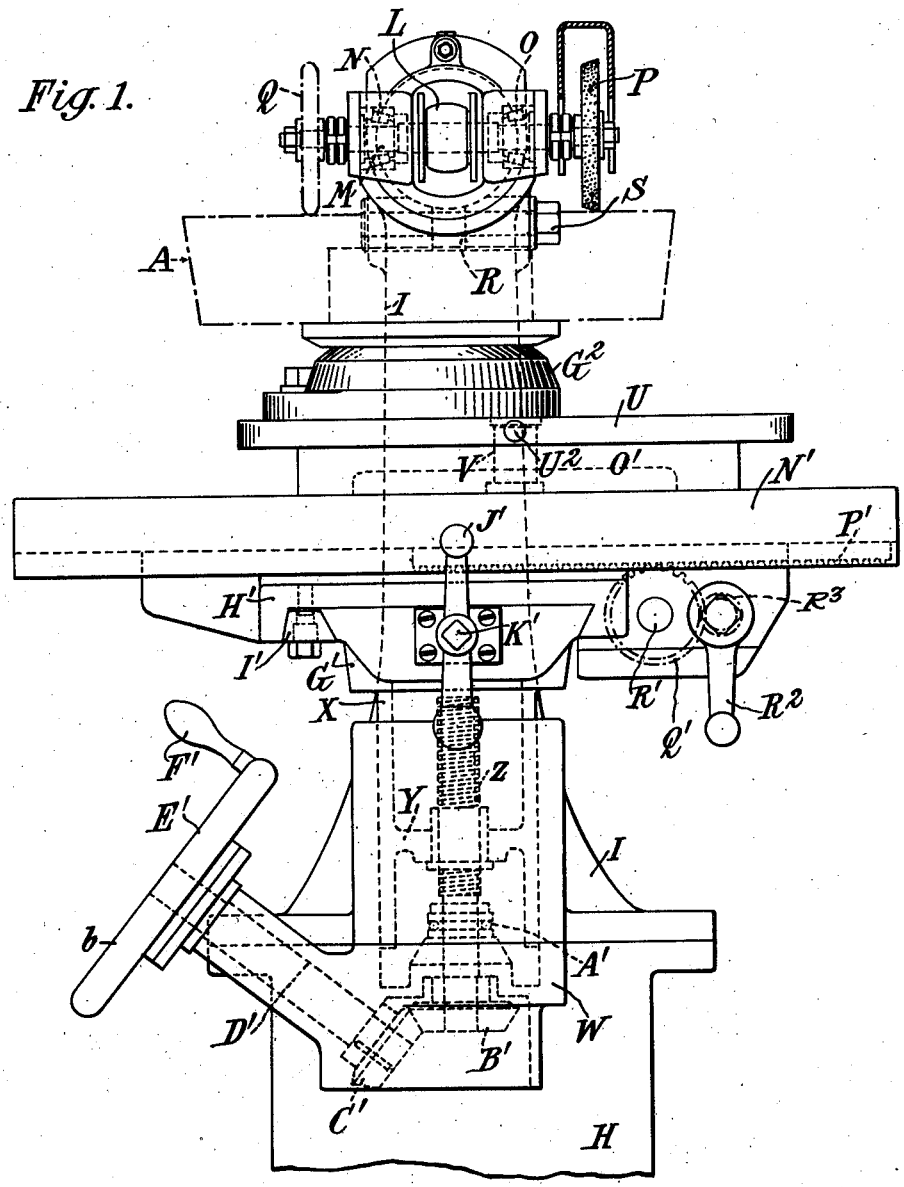
Figure 1 is a front view of a machine embodying the invention.
Figure 2:
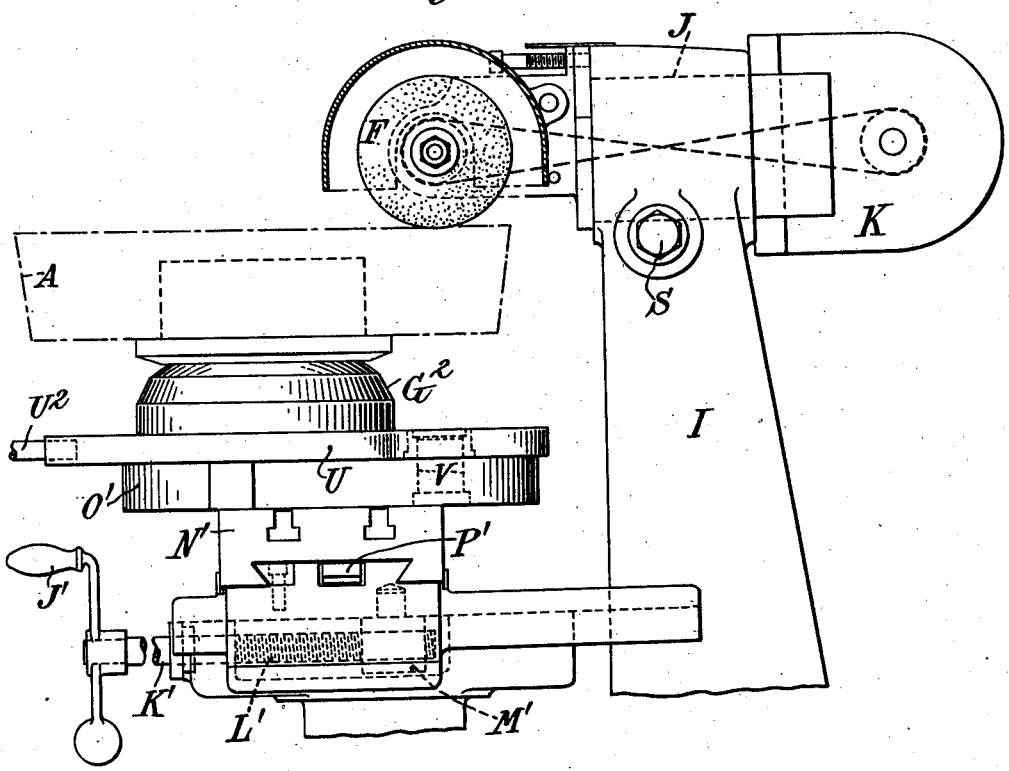
Fig. 2 is a side view of the upper part of the machine.

Mounted upon the upper end of the plunger is a head-piece G' which constitutes a slideway for a movable bed H', the sides of the plunger head G' being beveled and the inner sides of the movable bed H', being also beveled, as best seen in Fig. 1. Preferably there is arranged an adjusting strip I' so that these parts may be snugly fitted. The movement of the bed piece H' is to the front and rear of the machine, and this movement is accomplished by an adjusting handle J' at the front of the machine, which is fastened to a shaft K', provided with a screw thread L', operating in a fixed nut M' which is fastened to the bed H'. By moving the handle the bed H' may be caused to approach and recede from the standard I.

The bed H' in turn serves as a slideway for a transversely movable carrier N', the upper face of the bed being beveled, as shown, and the carrier N' having reverse bevels. The carrier N' is designed to move transversely of the machine and carry with it a platen O' upon which the swinging work-table U is pivoted.

The adjusting movements of the platen O' are secured by a rack P', which is carried by the transversely slidable part N', which is operated on by a pinion Q' arranged beneath it and supported upon a shaft R' carried upon the bed H'. The shaft may be turned by any suitable handle such as $R^2$ which turns a pinion $R^3$ meshing with the pinion Q'.

It will be observed that the cutter wheel, being mounted on the swinging work-table U, may be raised and lowered by the hand wheel E' to bring it into and out of work position, and to accommodate cutters of different thicknesses. Adjustments by the hand lever J', by bringing the work-table nearer to or farther from the standard I, adjusts the pivotal point around which the work-table swings nearer to or farther from the cutting wheel. The adjustments of the handle $R^2$ move the pivotal axis of the work-table to the right or to the left. The net result of these various adjustments is to permit the sharpening of cutters of different diameters and different thicknesses. They also, by displacing the pivotal axis of the work-table relatively to the grinder face, permit the swinging of the cutter teeth past the grinding face while the cut is being made in any desired arc, corresponding to the contour of the cutter tooth or the desire of the operator. That is to say, an arc of cut may be obtained of any radius struck from any point within the capacities of the machine. Ordinarily the edge of the cutter tooth will lie in the arc described without adjustment during the movement of the grinder wheel from the apex to the base of the cutter tooth. If a second cut is required on the same tooth, a proper adjustment will be made to elevate the cutter or to displace the pivotal axis of the work-table with or without changing the radius of the arc. If desired, however, during a single cut an adjustment may be made to vary a portion of the arc and, hence, the character of the cut, or an adjustment may be made to vary the depth of the cut on different parts of the cutter tooth.

When it is desired to move the cutter wheel so that the grinder will operate on another tooth, this may be done by merely rotating the cutter by hand. A very simple device is provided by the invention for holding the cutter wheel in its suggested position. In this device there is mounted upon the swinging work-table a slotted arm A² held to the work-table by a bolt, in which arm there is mounted an upright rod B², having an angle portion C² upon which is slidably mounted a collar D² adapted to be bolted in adjusted positions. This collar carries a split hub E² which is adapted to clamp a spring-stop F². This spring-stop bears against the side face of any one of the cutter teeth which are not being ground, thus holding the cutter wheel against rotation due to the angular force occasioned by the grinder operating against the tooth being ground. The spring character of the stop permits the latter to ride over the face of each tooth when a new tooth is brought into grinding position.

Figure 4:
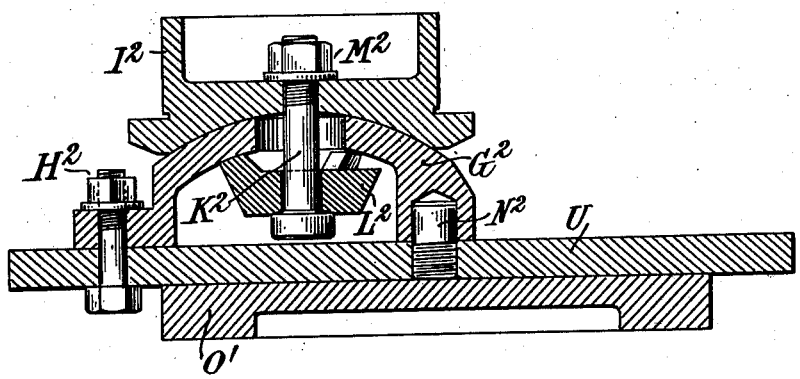
Fig. 4 is a section of Fig. 3 taken on the line 4—4.
Figure 3:
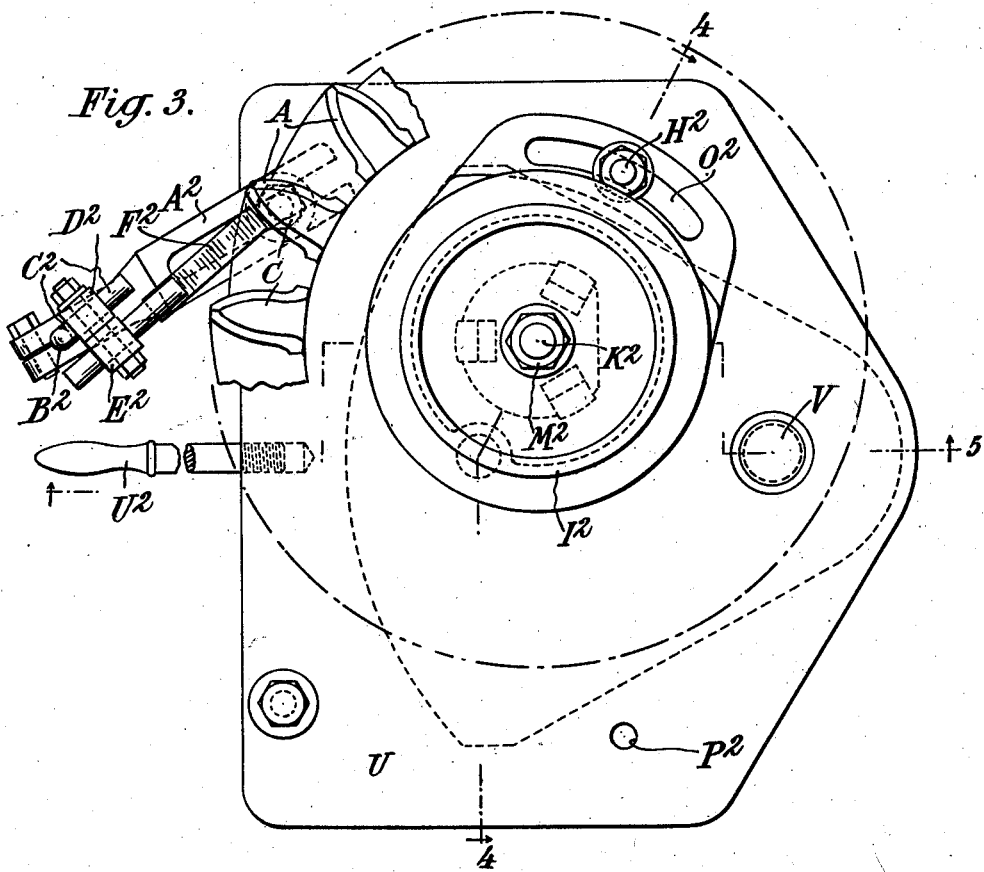
Fig. 3 is a plan of the movable table for carrying the cutter during the grinding operation.
Figure 5:
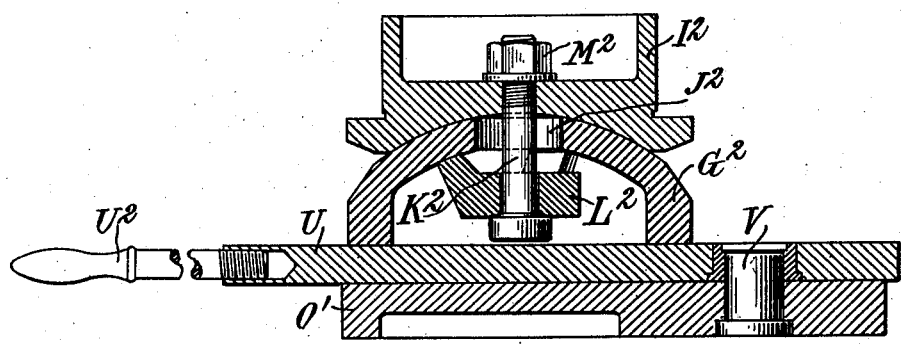
Fig. 5 is a similar section taken on the line 5—5 of Fig. 3.

For sharpening some cutters it is desirable that the cutter wheel as a whole should be presented to the grinder at a slight angle to the horizontal. In Figs. 3 and 4 I have shown one device for this purpose. In these figures a dome G² is fastened on the work-table in proper position by a bolt H², the curved upper side of this forming a bearing for a cutter holder I², on the periphery of which the cutter is mounted. The part G² has an enlarged central aperture J² through which a bolt K² passes, which bolt passes through and engages a spider-like washer L² which straddles the hole. By loosening a nut M² the cutter holder I² can be adjusted to any angle to the horizontal which is desired, and held in such position by tightening the nut. As the cutter is rotated around the cutter holder to feed the successive teeth, each tooth will occupy the same angular position as any other tooth during the grinding operation.

It is also desirable that the cutter holder shall be capable of easy adjustment to move the axis of the cutter toward and from the pivotal axis of the work-table. For this purpose I prefer to pivot the dome G² to the work-table, as by a stud N² (Fig. 4), and to provide on the opposite side of the dome a slot O² within which the bolt H² extends. By loosening the bolt H² the cutter holder I² may hence be adjusted toward the front and rear. By this construction also the cutter holder may be swung from one side of the work-table to the other by removing the bolt H² and swinging the cutter holder around its pivot to the opposite side of the work-table, and there inserting the bolt H² through a supplemental hole P² shown in Fig. 3.

In operating the device customarily the same sides of all the teeth will be sharpened during one adjustment of the machine, employing, let us say, the right-hand grinder P in Fig. 1. When this operation is completed the grinder P will be removed, the grinder Q will be adjusted in place, and the work-table adjusted to bring its pivotal axis on the opposite side of the machine, whereupon the other sides of the cutter may be ground. Since the character of cuts of the grinder on opposite sides of the teeth are different, appropriate conformations of grinder wheels will be used. Also since in a left-hand cutter the two classes of cutting edges are in a reverse position to those of a right-hand cutter, the grinding wheels will be shifted right for left. It is also desirable to swing the cutter-holder I² over to its opposite position on the work-table.

I have hereinbefore referred to the fact that the particular teeth shown in the cutter of Fig. 6 involve certain improvements, and these may now be described with reference to Fig. 7 et seq. In these figures I have shown detached one of the teeth of the cutter wheel A in perspective, it being understood that the teeth may be formed separately, as shown, or may be integral with the hub of the cutter wheel. In this construction the tooth as a whole is indicated by the reference letter $a$. $b$ and $c$ are respectively the curved sides of the teeth. $d$ may be taken as representing a flat surface corresponding to the plane of rotation of the cutter wheel. The face $e$ represents the formation of the cutter on what may be called the acute side of the tooth, that is to say, that side which because of the helical angle of the tooth would form with the plane of rotation an acute cutting edge. As before stated this acute edge should be rendered more obtuse as by the face $e$. The opposite side of the tooth, which normally would be too obtuse for a proper cutting edge, is ground inwardly, as shown at $f$, to render the cutting edge more acute. In the formation of this side of the cutting edge I produce a deeply curved groove of such character as to provide a cutting edge $g$ which is considerably less than a right angle, and this groove is sufficiently wide to extend well toward the middle of the tooth. Preferably its curvature increases toward the end of the cutting surface of the tooth, which is indicated roughly in Fig. 7 at $h$, whence it may continue at the same curvature or somewhat less to the base of the tooth $i$. The provision of this wide deep groove I have found in practice secures a much better cutting operation than the formations heretofore employed. It apparently assists the tool in producing a better cut with less liability of clogging.

While I have shown and described the preferred form of the invention, it will be understood that many changes or modifications may be made therein without departing from the spirit of the invention. It is of course within the invention to fix the work in position and impart to the grinder relative movements corresponding to the described movements of the work.

I claim as my invention:

1. In a grinding machine adapted to sharpen the faces of gear cutters of the shaper type, the combination with a grinding wheel and a work supporting plate angularly mounted with respect to each other, of pivot means for mounting said plate for arcuate operating movement in its own plane, means for adjusting said plate and the pivotal point thereof with respect to the axis and face of said wheel whereby said plate may be swung about said pivot means through an arc beneath said wheel, and a work holding device disposed on said plate at a point remote from said pivot means, said work holding device comprising a part adapted to engage the bore of a cutter mounted thereon, and a second pivot means connecting said device to said plate, said second pivot means being upright with respect to said plate and located remote from the center of said work holding device, whereby said device may be adjustably rotated on said plate to vary the distance between the center of said device and the first named pivot means.

2. In a grinding machine adapted to sharpen the faces of gear cutters of the shaper type, the combination with a grinding wheel and a work supporting plate angularly mounted with respect to each other, of pivot means for mounting said plate for arcuate operating movement in its own plane, means for adjusting said plate and the pivotal point thereof with respect to the periphery of said wheel whereby said plate and work thereon may be swung through an arc beneath said wheel, and a work holding device disposed on said plate at a point remote from said pivot means, said device being formed to receive a gear cutter with the axis thereof intersecting the plane of said plate, with means to tilt said gear cutter in all directions with respect to a perpendicular to said plate through said holder, and with means to swing said holder on said plate, said last named means comprising a second pivoted connection spaced from the center of said holder whereby said holder and a cutter mounted thereon may be arcuately adjusted on said plate with respect to the distance between the center of said holder and said first named pivot means.

3. A grinding machine for gear cutters of the shaper type, comprising, in combination with a grinding wheel and an adjustable carriage angularly mounted with respect to and below said wheel, a plate mounted on and in parallelism with the carriage, an upright pivot bearing connecting said plate to said carriage for arcuate operating movement of said plate in its own plane beneath said wheel, a cutter holder disposed on said plate, and a nutatably adjustable connection between said plate and said cutter holder.

4. A grinding machine for gear cutters of the shaper type, comprising, in combination with a grinding wheel and an adjustable carriage angularly mounted with respect to and below said wheel, a plate mounted for arcuate swinging movement in its own plane, said plate being pivotally connected to said carriage, a cutter holding device mounted on said plate, said device having an upright pivot connection with said plate at a point removed from the center of said device, whereby said holder may be turned on said plate to vary the distance from its center to the pivotal connection between said plate and carriage, said cutter holder being provided with a nutatably adjustable cutter engaging part whereby a cutter mounted thereon may be inclined to said plate at variable distances from the pivotal axis thereof.

5. A grinding machine for gear cutters of the shaper type, comprising, in combination with a grinding wheel and a carriage angularly mounted with respect to and below said wheel, a plate disposed on and parallel to said carriage, a pivot connecting said plate and carriage for arcuate movement of said plate under said wheel in its own plane, a second pivot disposed in an upright position on said plate, a cutter holder device formed with a spherical dome and connected to said pivot at a point remote from the center of said dome, whereby said holder may be rotatably adjusted to vary the distance between its center and the first named pivot, said device further including a work receiver formed with a spherical socket mounted on said dome, means connecting said holder and receiver to hold said receiver in a canted position, and a cylindrical surface on the exterior of said receiver adapted to engage the bore of a cutter to be sharpened, whereby a cutter mounted on said receiver may be secured with its axis inclined to the plane of the plate and may be swung through an arcuate path into contact with said wheel.

6. A sharpening machine for gear cutters of the shaper type, such cutters being in wheel form and having a plurality of teeth projecting radially outward from its body, the cutter wheel having a front face and a rear face, both faces being perpendicular to the axis of the wheel, and each tooth having two curved cutting edges each formed on the front side of the wheel at the intersection of such front side with a side of the tooth, such machine comprising a pivoted work-table constrained to swing edgewise in a definite plane, and having means for holding such a cutter wheel in an approximately flat position on such table, so that it swings bodily approximately edgewise when said work-table is swung, said holding means being so positioned with regard to the pivot of the table that a curved side of a tooth of the cutter wheel held on said holding means may approximately correspond to an arc of the same radius struck from the work-table pivot, and a grinder positioned with its effective grinding point approximately at said arc and operating against a tooth of the cutter only at a cutting edge of the tooth, said machine being further characterized by the provision of means for changing the inclination of the holding means to tilt the cutter with respect to the table.

7. The method of sharpening a tooth of a cutter of the shaper type having cutting edges formed by the intersection of the involute side faces of the tooth with the plane front face thereof which comprises swinging the cutter about a fixed axis so as to present the front face of the tooth only at a cutting edge thereof tangentially to a grinding wheel along an arcuate path which approximates, but differs from, the involute curvature of the side face of the tooth.

8. The method of grinding a tooth of a gear cutter of the shaper type having cutting edges formed by the intersection of the curved side faces of the tooth with the front face thereof which comprises swinging the cutter about a fixed axis past a grinding wheel so that the front face of the tooth of the cutter is presented tangentially to the grinding wheel only along one cutting edge thereof in an arcuate path which approximates the curvature of the adjacent side face of that tooth.

9. A sharpening machine for gear cutters of the shaper type, such cutters being in wheel form and having a plurality of teeth projecting radially outward from its body, the cutter wheel having a front face and a rear face, both faces being perpendicular to the axis of the wheel, and each tooth having two curved cutting edges each formed on the front face of the wheel at the intersection of such front face with a side face of the tooth, such machine comprising a work table having a pivot mounting which permits arcuate movement of the table in its own plane, a device for holding a cutter on such table with its front face lying in a plane spaced from the plane of the table, means for adjusting the position of said device and a cutter carried thereby with respect to the pivot so that the curved side face of one tooth of such cutter substantially coincides with an arc lying in the second mentioned plane and having its center lying on the pivotal axis of the table, a grinding wheel mounted for rotation in a plane which is angularly disposed with respect to the plane of arcuate movement of the table, and means for adjusting the position of the table pivot so that the plane of the grinding wheel intersects the second mentioned plane along a tangent to said arc at the periphery of the wheel.

10. A sharpening machine for gear cutters of the shaper type, such cutters being in wheel form and having a plurality of teeth projecting radially outward from its body, the cutter wheel having a front face and a rear face, both faces being perpendicular to the axis of the wheel, and each tooth having two curved cutting edges each formed on the front face of the wheel at the intersection of such front face with a curved